April 7, 1970   H. G. LEE   3,504,847
MEASURING APPARATUS WITH SHAFT ENCODER HAVING CAM ACTUATED
READOUT MEANS INCLUDING TAPE PUNCH AND TELEMETERING SWITCH
Filed April 8, 1968   4 Sheets-Sheet 1

HAROLD G. LEE
*INVENTOR*
BY
BUCKHORN, BLORE, KLARQUIST & SPARKMAN
*ATTORNEYS*

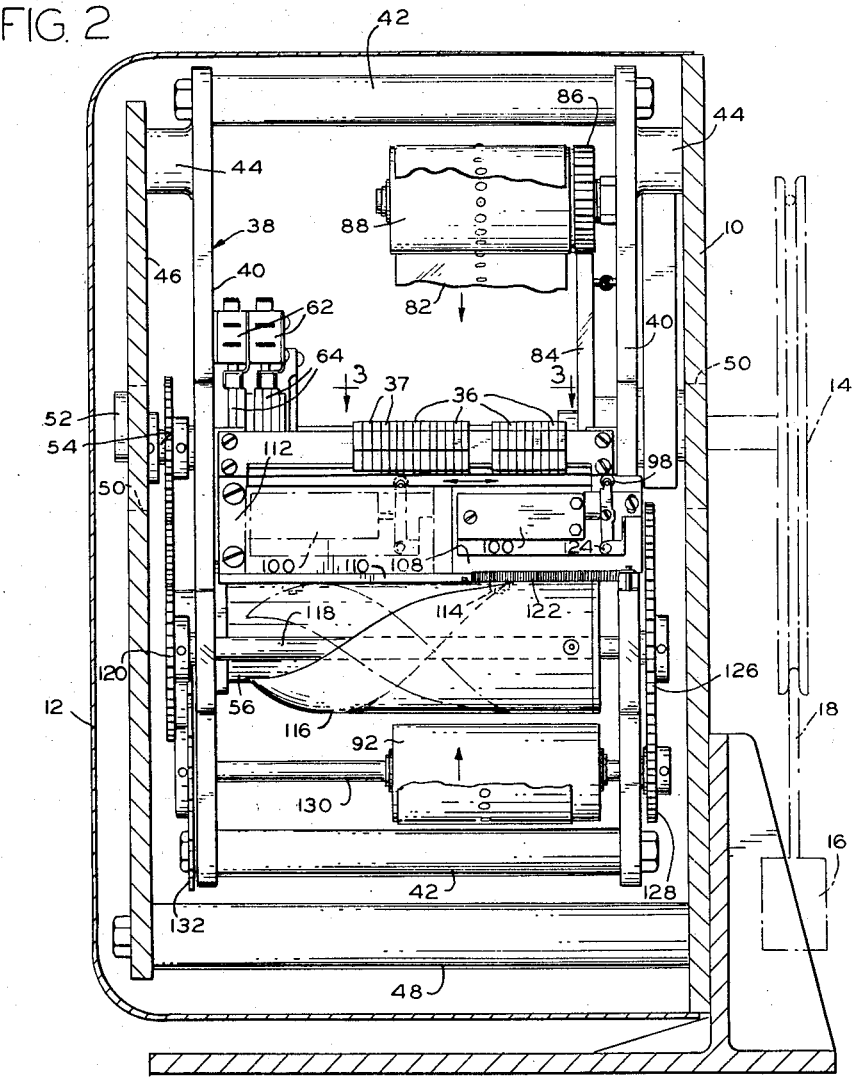

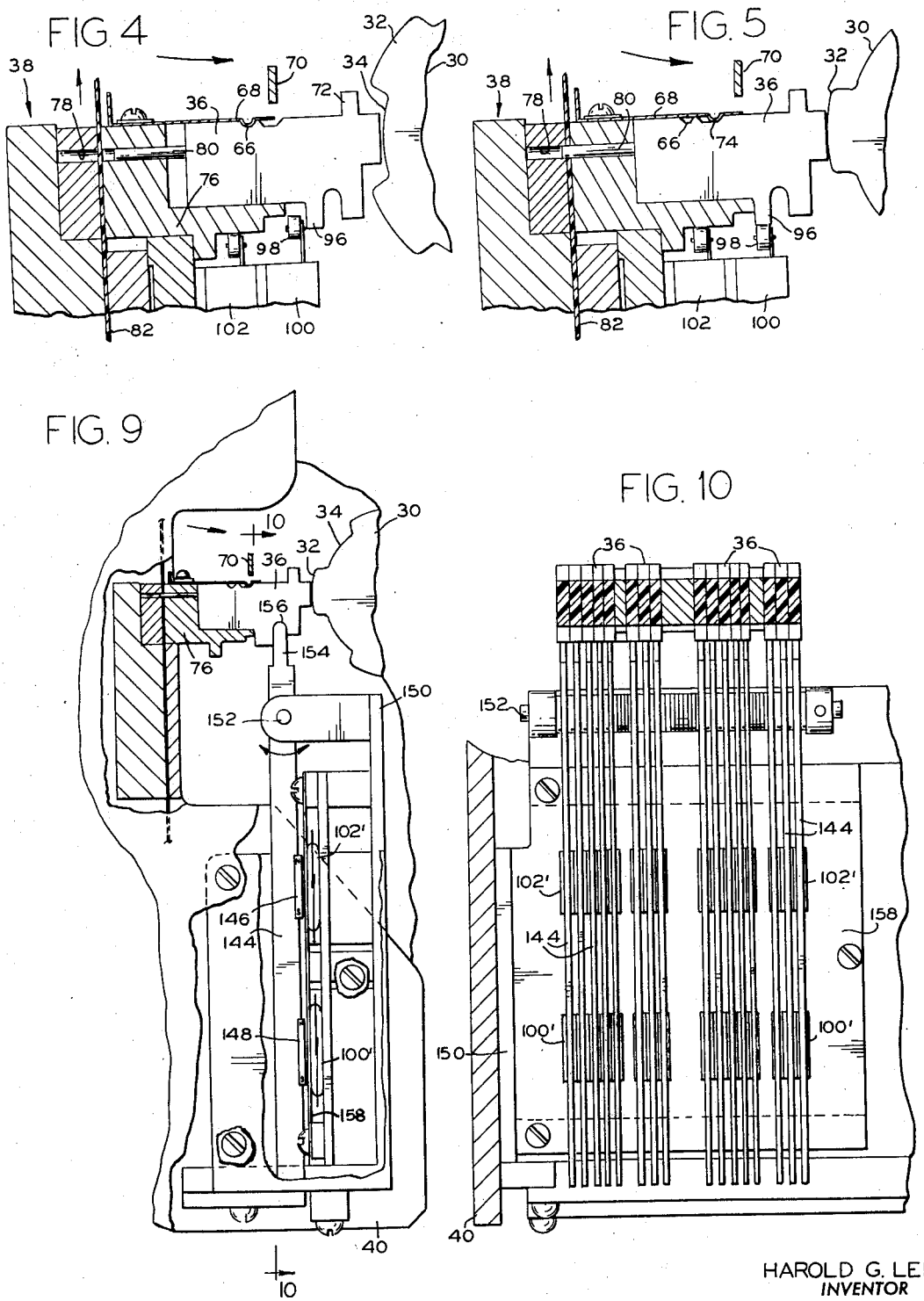

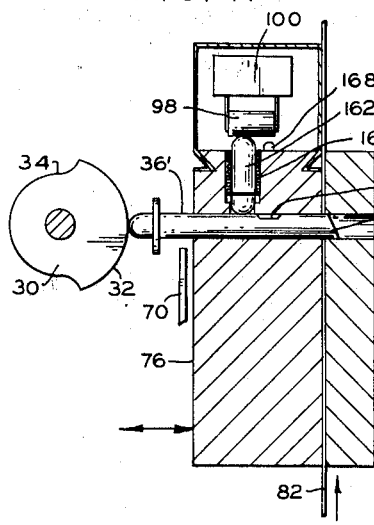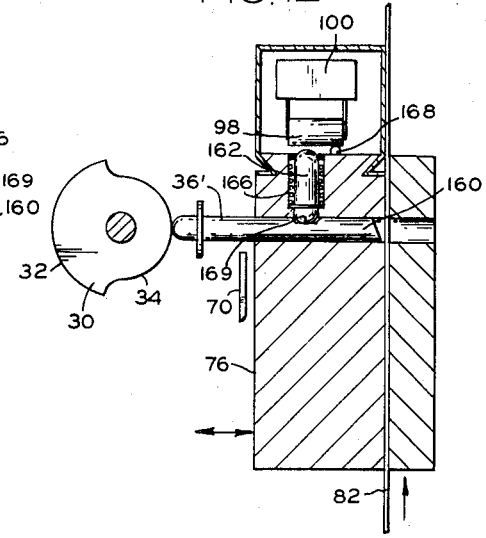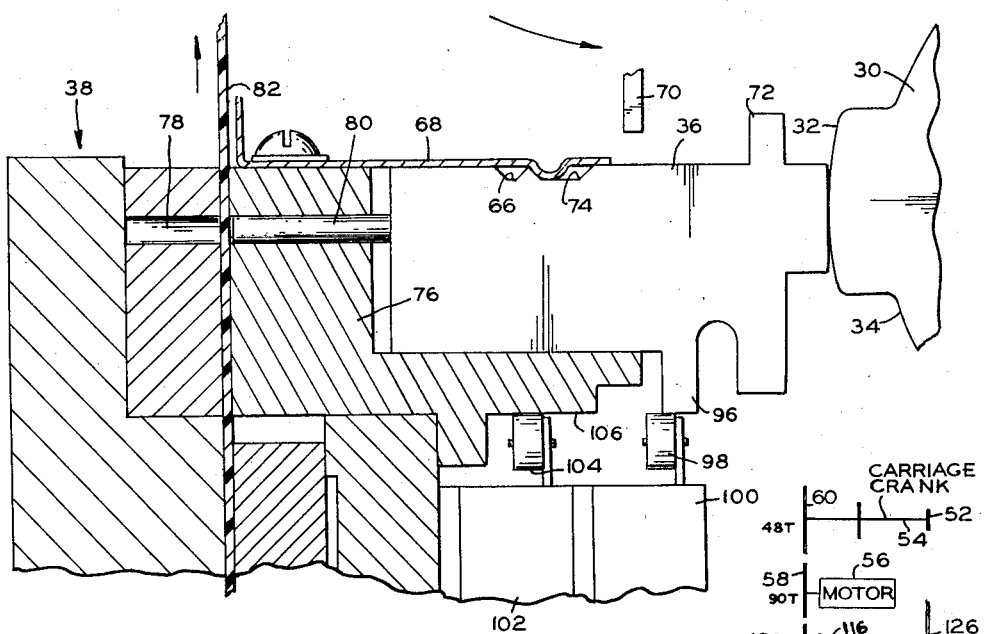

United States Patent Office 3,504,847
Patented Apr. 7, 1970

3,504,847
MEASURING APPARATUS WITH SHAFT ENCODER HAVING CAM ACTUATED READOUT MEANS INCLUDING TAPE PUNCH AND TELEMETERING SWITCH
Harold G. Lee, Portland, Oreg., assignor to Leupold & Stevens Instruments, Inc., Portland, Oreg., a corporation of Oregon
Filed Apr. 8, 1968, Ser. No. 719,464
Int. Cl. G06c 29/00; G06f 3/08
U.S. Cl. 235—61                                10 Claims

ABSTRACT OF THE DISCLOSURE

A measuring apparatus is described including a shaft encoder having cams forming a revolution counter and readout means for sensing such cams to indicate the counter reading. The cam sensing elements are mounted on a carriage which is pivoted between sense, store, and clear positions. The sensing elements are moved to either of two longitudinal positions on the carriage upon engagement with the cams which have raised and recessed portions arranged in a binary code, and are stored in this longitudinal position until they are all cleared into the same position before the next counter reading is taken. The carriage may cause the sensing elements to actuate a tape punch in one cam sensing position, or to actuate a telemetering switch in another sensing position without actuating such punch, while later in the store position the sensing elements may operate the telemetering switch to produce an electrical readout signal indicating the previously sensed counter reading.

BACKGROUND OF INVENTION

The subject matter of the present invention relates generally to measuring apparatus employing shaft encoders for converting analog information to digital information and in particular to such apparatus in which the shaft encoder has a plurality of cams forming a revolution counter and a readout means for sensing such cams to take the counter reading, for storing the counter reading, and for subsequently indicating the value of such reading. Tape punches and telemetering switches are actuated by the cam sensing elements of the readout means to provide a permanent record of an electrical readout signal of the counter reading. The telemetering switch may be actuated without actuating the tape punch to enable them to be operated separately at different times. Thus the tape punch may be actuated by a timer at a lower frequency than the switch. Alternatively, the punch may be actuated from a remote signal source only after the telemetering signal indicates a change has been sensed by the encoder, in order to conserve tape, such as when the counter reading remains unchanged over a long period of time.

The measuring apparatus of the present invention may be employed for recording liquid levels by means of a float connected to a pulley attached to the input shaft of the encoder. However, the shaft encoder may also be connected to any other source of analog information which can be converted into digital information by rotation of such shaft. Thus the measuring apparatus can also be used for the measurement of rain or snow precipitation, humidity, temperature, pressure, flow rate of rivers, etc. The present apparatus is portable and may be battery-operated to enable unattended operation in remote locations for long periods of time during which the tape saving feature may be very important. By means of the telemetering switch, an electrical readout signal is produced for each counter reading which may be monitored at a distant station. The tape punch provides a permanent record of the counter reading which may be employed as the input to a computer.

The measuring apparatus of the present invention has several advantages over previous measuring apparatus such as that shown in U.S. Patent 3,117,719 of J. S. Wapner et al. Thus the present measuring apparatus is more versatile and economical to operate in that it is capable of providing an electrical readout signal for telemetering purposes without punching the tape. Also when it is desired to permanently record the changes measured by the shaft encoder, a punch tape readout may be produced and later on the same counter reading may be again transmitted by electrical readout signal.

It is therefore one object of the present invention to provide an improved measuring apparatus of a simple and more versatile construction including a shaft encoder and readout means which is capable of storing a reading taken of such encoder to enable subsequent indication of such reading.

Another object of the present invention is to provide an improved measuring apparatus including a shaft encoder for converting analog to digital information and readout means for reading out such information either as an electrical signal or punched tape, as desired.

A further object of the present invention is to provide an improved measuring apparatus including a shaft encoder having cams forming a revolution counter and readout means having cam sensing elements which sense and store the counter reading as well as actuate a tape punch and electrical switch in different positions of a carriage on which such elements are mounted.

An additional object of the present invention is to provide an improved measuring apparatus employing a shaft encoder and a readout means capable of producing an electrical signal in the form of binary coded pulses corresponding to the encoder reading and which may be easily adapted to provide such signal as a series of successive pulses or a plurality of simultaneous parallel pulses.

Other objects and advantages of the present invention will be apparent from the following detailed description of preferred embodiments and from the attached drawings of which:

FIG. 2 is a vertical section view taken along the line 2—2 of FIG. 1;

FIG. 3 is a horizontal section view taken along the line 3—3 of FIG. 2 showing a portion of the cam sensing elements and detents;

FIG. 4 is an enlarged view of a portion of FIG. 1 showing the cam sensing element in a first longitudinal position on its carriage;

FIG. 5 is an enlarged view similar to that of FIG. 4 showing the cam sensing element in a second longitudinal position in which the tape is punched;

FIG. 6 is an enlarged view similar to FIG. 5 showing the cam sensing elements in a third longitudinal position which enables electrical readout without tape punching;

FIG. 7 is a diagram of the gear train employed in the apparatus of FIG. 1;

FIG. 8 is a schematic diagram showing the different pivotal positions of the carriage for the cam sensing elements;

FIG. 9 is an enlarged view of a portion of another embodiment similar to the apparatus of FIG. 1 but modified to provide a parallel electrical readout;

FIG. 10 is a vertical section view taken along the line 10—10 of FIG. 9;

FIG. 11 is a section view of a third embodiment employing separate cam sensing elements and memory pins for electrical readout, with such elements shown in a first longitudinal position; and FIG. 12 is a section view similar to FIG. 11 showing the cam sensing elements in a second longitudinal position.

Figure 1:
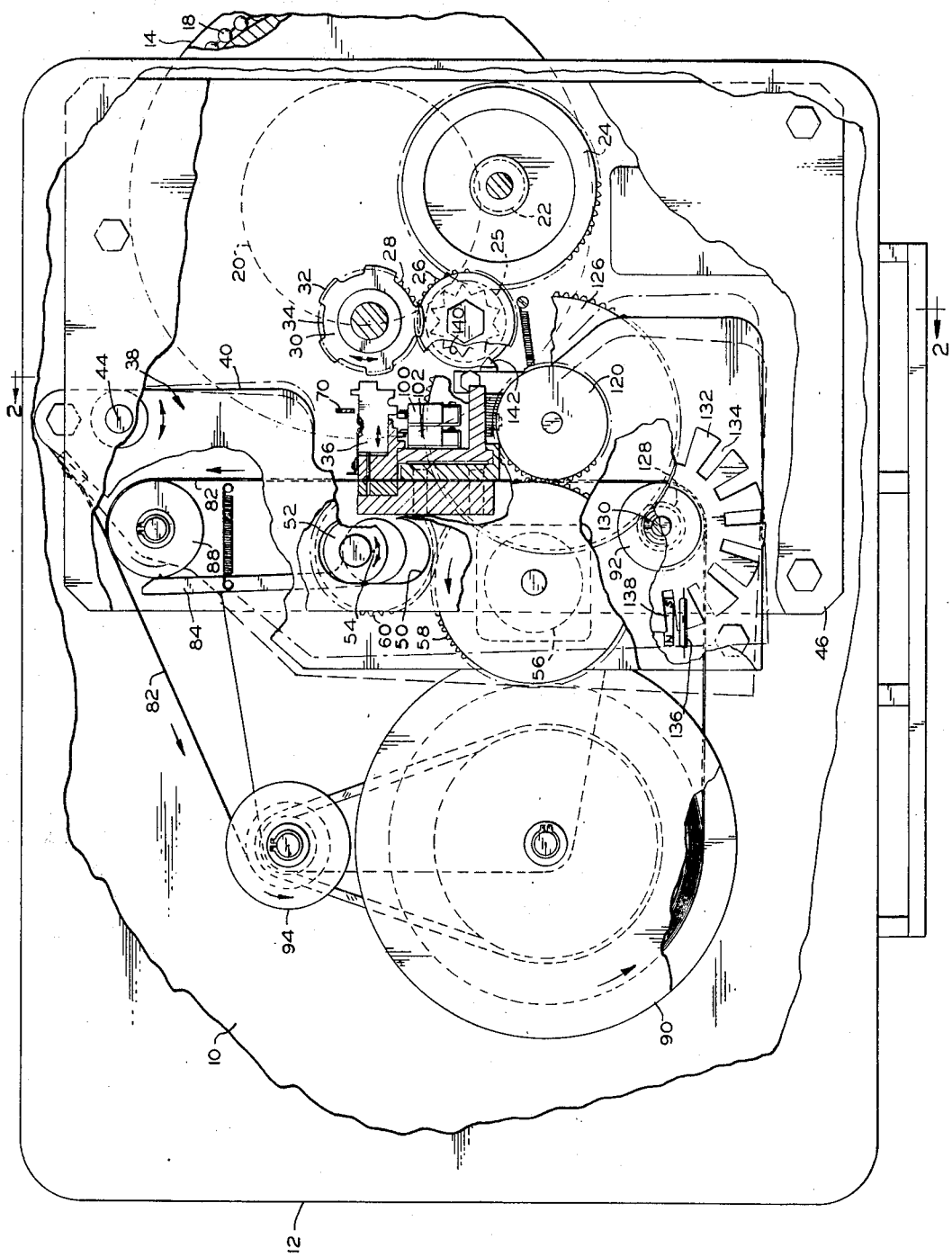
FIG. 1 is a plan view of the measuring apparatus of the present invention with parts broken away for purposes of clarity.

As shown in FIGS. 1 and 2 the measuring apparatus of the present invention includes a frame 10 and a cover 12 forming the housing for such apparatus. A float pulley 14 positioned outside of the housing is connected by its shaft through an aperture in the frame to a shaft encoder apparatus within such housing in a manner hereafter described. The pulley is driven by a float 16 coupled to such pulley by a bead chain 18, when the measuring apparatus is employed to measure liquid level. The float pulley shaft is connected to a first gear 20 of 100 teeth which drives a second gear 22 of 20 teeth secured to a shaft on which a third gear 24 of 90 teeth is attached. The third gear drives a fourth gear 25 of 30 teeth whose shaft is connected to a fifth gear 26 of 40 teeth which is in turn coupled to a sixth gear 28 of the same number of teeth forming the input gear of the shaft encoder. Thus for every revolution of the float pulley 14, the input gear 28 of the shaft encoder makes 15 revolutions.

The shaft encoder is provided with a plurality of cams 30 having raised cam surface portions 32 and recessed cam surface portions 34 arranged in a binary code around their circumference with the raised surface 32 corresponding to a "1" and the recessed surface 34 corresponding to a "0" in such code. The cams provide a binary coded decimal counter which indicates the rotational position of the input shaft by the coded arrangement of the cam surfaces on the plurality of cams 30 at the readout position of such counter. One suitable shaft encoder is shown in my earlier U.S. Patent No. 3,268,712.

A plurality of cam sensing elements 36 are supported adjacent the readout positions of different ones of the shaft encoder cams 30 to sense the output reading and produce an electrical readout signal of such reading of the counter. In addition other similar elements 37 are provided merely to provide an electrical signal identifying the particular apparatus which is the source of such readout signal. The sensing elements are all mounted on a pivoted carriage 38 for movement of such sensing elements into and out of engagement with the cam surfaces. As shown in FIG. 2, the carriage 38 includes a pair of side plates 40 which are connected together by bolts extending through spacer sleeves 42 between such plates and such plates are mounted by pivots 44 between the frame 10 and a support plate 46 attached to the frame 10 by bolts and spacer sleeves 48 positioned therebetween. The carriage 38 is pivoted about pivots 44 into at least three positions as shown in FIG. 1, including a sense position shown by dash-dot lines, a store position shown by solid lines, and a clear position shown by dash-dash lines. In the sense position the sensing elements 36 are moved into contact with the cams 30. In the store position the sensing elements are moved back out of contact with the cams but are maintained in their "sensed" longitudinal position with respect to the carriage. In the clear position the sensing elements are all moved into the same longitudinal position on the carriage. This is diagrammatically illustrated in FIG. 8. In addition, the carriage may also be moved into a sense and punch position II', instead of the sense position II, to enable the sensing elements 36 to punch holes in a tape to make a permanent record of the encoder reading. Thus the sequence of operation is, first the carriage is positioned in the clear position (I), second the carriage is moved to the sense position (II), or the sense and punch position (II'), and third the carriage is moved to the store position (III). An electrical readout signal may be produced corresponding to the stored encoder reading by actuating a switch with the cam sensing elements in the store position of the carriage as hereafter described.

As shown in FIGS. 1 and 2, slots 50 are provided in a frame 10 and a support plate 46, and an eccentric 52 is provided in such slot and connected to a gear shaft 54 extending between the carriage side plates 40 to provide a crank for pivoting the carriage about pivots 44. A D.C. electric motor 56 is mounted on a carriage side plate 40 and has its shaft connected to a first gear 58 of 90 teeth, which meshes with a second gear 60 of 48 teeth connected to the shaft 54 on which the eccentric is mounted. As a result of the eccentric 52 being held in the fixed slot 50, the shaft 54 reciprocates back and forth in an arc when the motor rotates gear 60 connected to such shaft. This crank action of the shaft 54 and eccentric 52 causes the entire carriage 38 to pivot back and forth about pivots 44 between the different positions indicated in FIG. 8. The carriage is held in the three positions provided for sensing, storing and clearing by stopping the electric motor with cam actuated switches 62 and other similar switches (not shown) which are operated by cams 64 mounted on the rotating shaft 54.

As shown in FIGS. 4 and 5, when the carriage 38 is rotated into the sense and punch position of FIG. 8, the cam sensing elements 36 are moved into contact with either a recessed cam surface 34 or a raised cam surface 32, depending upon the position of the cam 30 associated with such sensing element. If the sensing element 36 engages the recessed cam surface 34, as shown in FIG. 4, it remains in a first longitudinal position determined by a notch 66 provided in its upper surface into which a detent spring 68 has been inserted during the previous clearing position of the carriage by a fixed clearing bar 70 which engages a clearing projection 72 on each of the cam sensing elements 36. As shown in FIG. 3 the clearing bar 70 does not engage the identification elements 37 which are set manually in "0" or "1" positions. These elements 37 do not sense the encoding cams 30 or punch the tape 82 but merely actuate the electrical switches 100 and 102 to provide a constant identification signal.

However, if the cam sensing element 36 engages a raised cam surface 32, as shown in FIG. 5, it is pushed to the left into a second longitudinal position with respect to such carriage and determined by a slot 74 provided in the upper surface of the sensing element to the right of slot 66. Further movement of the sensing element 36 is prevented by engagement of a stop shoulder on such element with a flange on a punch head 76 affixed to such carriage. The punch head is provided with a passageway 78 therethrough in which a punch pin portion 80 extending from the left end of the cam sensing element 36, slides to punch a hole through a paper tape 82 moving through a slot in such punch head. The cam sensing element 36 may be made of nylon to reduce wear of the cams, etc., while the punch pin portion is made of metal. The tape 82 is moved upward through the punch head one punch space each time the carriage reaches the clear position by means of a pawl 84 and a ratchet wheel 86 which drives the tape advance roll 88, as shown in FIGS. 1 and 2. The pawl 84 is attached at one end to the shaft 54 so that it moves up and down once for each rotation of such shaft and causes the tape to advance one step when the carriage is moved to the clear position from the store position. As a result the tape is moved from a supply drum 90 across an idler roller 92 and the advance roll 88 to take up drum 94.

As shown in FIG. 6, the cam sensing element 36 may be positioned in engagement with the raised cam surface 32 without punching the tape 82 by pivoting the carriage into the sense position II of FIG. 8. In this sense position the sensing element 36 moves to the left into a third horizontal position on the carriage intermediate between the two longitudinal positions of FIGS. 4 and 5. Thus while the detent spring 68 moves out of notch 66 into notch 74, it remains in the left-hand end of notch 74 which is provided with a width approximately equal to twice the width of the downward detent projection on detent spring 68. As a result, a switch actuator projection 96 on the sensing element 36 is moved into position so that it can be engaged by the actuator roller 98 of an electrical switch 100 to produce a pulse corresponding to the "1" position of the cam 30. If the cam is in the "0" position the sensing element 36 engages the recessed cam surface 34 and switch 100 will not be actuated because roller 98 is laterally displaced with respect to the sensing element projection 96. However a gate disk 132 and associated switch 136 produce an output pulse of opposite polarity under these conditions, as hereafter described. Another electrical switch 102 is provided adjacent switch 100 and connected in series therewith so that its actuator roller 104 engages a projection 106 on the punch head 76 to close switch 102 and enable the output pulse of switch 100 to reach the output terminal of the apparatus. A plurality of separate projections 106 are provided on the punch head, one for each of the corresponding sensing elements 36, so that the switch 102 always transmits a pulse when it and switch 100 are moved into alignment with a different sensing element. Thus switch 100 can be connected to produce positive "1" pulses, while the gate disk and switch 136 produce negative "0" pulses which are transmitted in the absence of such a positive pulse to provide an electrical readout telemetering signal in the form of a train of positive and negative pulses corresponding to the previously taken encoder reading.

The switches 100 and 102 are scanned across the sensing elements 36 in a reciprocating movement, as shown in FIG. 2. Thus the switches 100 and 102 and actuator rollers 98 and 104 are mounted on a switch support bracket 108, which is moved along a scanning track 110 provided on a scanner support plate 112 attached between the carriage side plates 40. This scanning movement is provided by a cam follower 114 attached to the bracket 108 and a rotating cam cylinder 116 which is mounted on a shaft 118 rotated by a gear 120 of 48 teeth coupled to the motor gear 58. As the cam cylinder 116 rotates, the cam follower 114 causes the switches 100 and 102 to move to the left through the dashed line position shown, until it reaches the left-hand end of the cam. When this happens a coil spring 122 attached between the bracket 108 and right-hand side plate 40 causes the switches to move back to the right into the solid line position. The switch actuator rollers 98 and 104 are mounted on an actuator arm pivoted to the bracket 108 at pivot 124 so that they actuate the switches 100 and 102 only during the return movement of such switches to the right caused by spring 122.

As shown in the gear train diagram of FIG. 7, the scanner cam shaft is also provided with a gear 126 of 112 teeth which meshes with another gear 128 of 16 teeth attached to a shaft 130 on which a gate disk 132 is mounted. The gate disk 132 is made of a suitable magnetic shielding material, such as soft iron, and is provided with a plurality of slots 134 corresponding to the number of cam sensing elements 36 and 37 as shown in FIG. 1. A gate switch 136 of the magnetic reed type and a permanent magnet 138 are provided on opposite sides of the gate disk 132 with the magnet in position to actuate the switch when its magnetic field passes through the slots 134. Since the gate disk 132 is rotated at constant speed by motor 56 and the solts are of a uniform width, the switch 136 is switched on and off at a constant frequency and maintained conducting for periods of constant time duration. The gate switch 136 is connected in series with the telemetering switches 100 and 102 in order to gate the positive output pulses of switch 102 and to produce negative output pulses in the absence of such positive pulses. The gate disk provides all of such pulses with a uniform width after transmission through the gate switch, which is desirable for telemetering purposes.

A locking mechanism shown in FIG. 1 including a detent wheel 140 provided on the shaft carrying the gears 25 and 26, is employed to lock the shaft encoder cams 30 in position while a counter reading is being taken by the cam sensing elements 36, in the sense position or sense and punch position of the carriage 38. This locking prevents ambiguity in such counter reading and is achieved by a spring biased detent plunger 142 whose pointed end is urged to the right into the notches of the detent wheel 140 by engagement with an actuator fixed to the carriage. The locking mechanism is similar to that shown in FIG. 4 of my earlier U.S. Patent No. 3,162,044. When the carriage is pivoted away from the sense position to the store position shown in solid lines in FIG. 1, the detent plunger 142 moves out of the notches in the detent wheel 140 to the position shown releasing the lock. To enable the float pulley 14 to continue to turn during the short period when the gear train of the shaft encoder is locked, the shaft for the second gear 22 is connected to the shaft of the third gear 24 by a coil spring coupling which enables the former shaft to rotate a limited amount with respect to the latter shaft.

Another embodiment of an electrical readout means which may be employed for the shaft encoder in the measuring apparatus of the present invention is shown in FIGS. 9 and 10 and includes a plurality of pairs of reed switches 100' and 102' which produce "1" and "0" bit pulses like switches 100 and 102 of FIG. 6. A different pair of switches is provided for each cam sensing element. A switch actuating arm 144 is provided for each pair of switches and two permanent magnets 146 and 148 are mounted thereon in position to energize switches 102' and 100', respectively, when moved into close proximity with such switches. The actuating arms 144 are pivotally mounted on a support bracket 150 by a pivot rod 152. The support bracket 150 is attached between side plates 40 for movement with the carriage 38. One end of the actuator arm 144 is provided with a rounded finger portion 154 which is held within a notch 156 provided in the bottom of the cam sensing element 36 associated therewith. Thus when the cam sensing elements are moved into their two longitudinal positions corresponding to the "0" and "1" position of the recessed cam surface 34 and the raised cam surface 32, respectively, the actuator arm is pivoted to two different positions. In the position shown the permanent magnet 148 actuates switch 100' and produces a positive pulse corresponding to a "1" bit in the binary code. In the other position of the arm when the sensing element engages cam recess 34 switch 102 is actuated, while switch 100 is not actuated due to its further spacing from the magnet 148. This produces a negative pulse signal representing an "0" bit in the binary code.

It should be noted that unlike the embodiment of FIG. 6, the embodiment of FIGS. 9 and 10 employs a separate telemetering switch for each shaft encoder cam and sensing element 36 to provide a parallel readout. This means that the electrical readout signal is in the form of a plurality of separate pulses produced simultaneously and transmitted in parallel to the monitor. The switches 100' and 102' are mounted within slots in a magnetic shield plate 158 which may be similar to that shown in my earlier Patent No. 3,268,712 mentioned previously, in order to prevent the magnets from actuating more than one switch even though adjacent switches are mounted close together.

It should be noted that the present measuring apparatus may easily be adapted to either of the two above mentioned electrical readout techniques, since the same cam sensing elements 36 are employed in either case and except for the switch means the rest of the apparatus is unchanged.

Still another embodiment of a readout mechanism which can be employed for the shaft encoder in the measuring apparatus of the present invention is shown n FIGS. 11 and 12. In this embodiment the cam sensing elements 36' are formed of two separate members including a punch pin 160 and a memory pin 162. The punch pin is provided with a notch 169 into which the memory pin 162 slides when the punch pin sense a receased cam surface 34 and moves into hte longitudinal position corresponding to the "0" bit, as shown in FIG. 12. The memory pin 162 is spring biased downward into contact with the punch pin 160 by a coil spring 166. The upper end of the memory pin 162 extends a further distance above the punch head 76 with its lower end out of the notch 169 when the punch pin is in engagement with the raised cam surface 32 as shown in FIG. 11. As a result, the scanning switch 100 is actuated when it passes over the memory pin to produce a "0" pulse of greater width than the "1" pulse produced by such switch when it is actuated by a smaller diameter indicator projection 168 provided on the top of the punch head adjacent each cam sensing element. The switch actuator roller 98 engages the projection 168 when the memory pin 162 is in its retracted position shown in FIG. 12 to actuate the switch 100 for a short time. Thus memory pin 162 functions like the projecting portion 96 of the sensing element 36 of FIG. 6, while indicator projection 168 functions like shoulder 106 on the punch head 76 of FIG. 6. However in the embodiment of FIGS. 11 and 12 distinction is made between the "1" and "0" bit pulses by providing pulses of different width, whereas in FIG. 6 the pulses are of different polarity.

It will be obvious to those having ordinary skill in the art that many changes may be made in the details of the above described preferred embodiments of the present invention without departing from the spirit of the invention. Therefore the scope of the present invention should only be determined by the following claims.

I claim:
1. Measuring apparatus comprising:
    shaft encoder means including a plurality of rotatable cams having raised and recessed cam surface portions arranged in a coded manner to provide a counter which determines the rotational position of an input shaft connected to said encoder means and rotated in accordance with variations in the characteristic being measured;
    readout means for reading said counter and storing the counter reading, including a plurality of cam sensing elements slidably mounted on a carriage member;
    means for moving said carriage member toward and away from said cams between a sense position, a store position and a clear position, to move said sensing elements into engagement with said cam surface portions in said sense position and cause said sensing elements to slide into one of two different longitudinal positions on said carriage member corresponding to said raised and recessed cam surface portions, to move said sensing elements out of engagement with said cam surface in said store position while maintaining said two longitudinal positions of said sensing elements, and to move all of said sensing elements into the same longitudinal position in said clear position of said carriage; and
    indicator means for indicating the counter reading taken by said readout means and actuated by the cam sensing elements in accordance with their longitudinal positions in at least the store position of said carriage member.

2. Measuring apparatus in accordance with claim 1 in which the indicator means includes electrical switch means actuated by the cam sensing elements for producing an electrical signal corresponding to said counter reading.

3. Measuring apparatus in accordance with claim 2 in which the switch means includes a single switch and scanning means for moving said switch past each of said cam sensing elements in succession to produce the electrical signal in the form of a series of pulses.

4. Measuring apparatus in accordance with claim 2 in which the switch means includes a plurality of switches and switch actuator means for operating each switch by a different cam sensing element substantially simultaneously to produce the electrical signal in the form of a plurality of pulses transmitted in parallel.

5. Measuring apparatus in accordance with claim 2 in which the indicator means also includes tape punch means actuated by a portion of the cam sensing element different than that which actuates the switch means.

6. Measuring apparatus in accordance with claim 5 in which the tape punch means includes a punch head attached to the carriage and punch pin portions provided on the cam sensing elements, and said readout means actuates said punch means by moving the carriage member past said sense position to a sense and punch position to cause said sensing elements to move into a third longitudinal position and punch the tape.

7. Measuring apparatus in accordance with claim 3 in which the cam sensing elements have projections which engage the actuator of the switch to operate such switch when it is scanned across said sensing elements.

8. Measuring apparatus in accordance with claim 4 in which the switch actuator means includes a plurality of actuator arms having magnets mounted thereon and connected to said cam sensing elements to move said magnets toward and away from the switches in order to magnetically actuate said switches.

9. Measuring apparatus in accordance with claim 3 in which the readout means includes memory elements separate from the sensing elements and mounted on the carriage member which are moved into either an extended position or a retracted position by the sensing elements depending upon the longitudinal position of said sensing elements, and the switch is scanned across said memory elements.

10. Measuring apparatus in accordance with claim 1 in which the sensing elements are provided with detent notches engaged by spring biased detent fingers attached to the carriage member to hold said sensing elements in their different longitudinal positions.

References Cited

UNITED STATES PATENTS

| | | | |
|---|---|---|---|
| 2,867,796 | 1/1959 | Kendall | 340—347 |
| 3,117,719 | 1/1964 | Wapner et al. | 235—58 |
| 3,427,632 | 2/1969 | Vahs et al. | 346—72 |

STEPHEN J. TOMSKY, Primary Examiner

U.S. Cl. X.R.

235—58, 60.4; 346—72